(12) United States Patent
Li et al.

(10) Patent No.: US 11,802,389 B2
(45) Date of Patent: Oct. 31, 2023

(54) ECOLOGICAL SEAWALL WATER CLOSE SIDE EMBANKMENT SLOPE DRAINAGE STRUCTURE AND CONSTRUCTION METHOD THEREOF

(71) Applicant: Guangdong Polytechnic of Water Resources and Electric Engineering, Guangzhou (CN)

(72) Inventors: Tie Li, Guangzhou (CN); Yimei Yuan, Guangzhou (CN)

(73) Assignee: GUANGDONG POLYTECHNIC OF WATER RESOURCES AND ELECTRIC ENGINEERING, Guangzhou (CN)

( * ) Notice: Subject to any disclaimer, the term of this patent is extended or adjusted under 35 U.S.C. 154(b) by 0 days.

(21) Appl. No.: 17/416,536

(22) PCT Filed: May 11, 2020

(86) PCT No.: PCT/CN2020/089634
§ 371 (c)(1),
(2) Date: Oct. 21, 2021

(87) PCT Pub. No.: WO2021/208168
PCT Pub. Date: Oct. 21, 2021

(65) Prior Publication Data
US 2022/0325488 A1 Oct. 13, 2022

(30) Foreign Application Priority Data
Apr. 17, 2020 (CN) .......................... 202010307367.3

(51) Int. Cl.
*E02B 3/06* (2006.01)
*E02B 3/12* (2006.01)

(52) U.S. Cl.
CPC . *E02B 3/06* (2013.01); *E02B 3/12* (2013.01)

(58) Field of Classification Search
CPC ..... E02B 3/04; E02B 3/06; E02B 3/10; E02B 3/12; E02B 8/06
See application file for complete search history.

(56) References Cited

U.S. PATENT DOCUMENTS 599,719 A * 3/1898 Manning .................. E02D 3/10
405/50
1,770,340 A * 7/1930 Lawaczeck ............... E02B 7/18
405/108

(Continued)

FOREIGN PATENT DOCUMENTS

CN 202989883 U 6/2013
CN 207211068 U 4/2018

(Continued)

OTHER PUBLICATIONS

Chen et al.; CN 202989883 machine translation; all; Dec. 2013 (Year: 2013).*

*Primary Examiner* — Benjamin F Fiorello

(57) ABSTRACT

The present invention discloses an ecological seawall water close side embankment slope drainage structure and a construction method thereof. The ecological seawall water close side embankment slope drainage structure includes a seawall, and further includes a wave dissipation ridge and water collecting wells, wherein the wave dissipation ridge is disposed at an upper side of the seawall, a drainage blind ditch is formed in an upper surface of the seawall, and the drainage blind ditch is matched with the wave dissipation ridge; the water collecting wells are distributed at a lower side of the drainage blind ditch at equal intervals, and lower end portions of the water collecting wells communicate with drainage concealed pipes; and pipe seats are disposed at a lower end portion of an inclined plane of the seawall, lower end portions of the drainage concealed pipes are fixedly connected onto the pipe seats, and flap valves are rotation- (Continued)

ally connected to lower end surfaces of the drainage concealed pipes. The present invention not only can reduce the erosion degree of sea waves to the seawall, but also can collect seawater going over the wave dissipation ridge and discharge the collected seawater into the sea again.

9 Claims, 2 Drawing Sheets

(56) References Cited

U.S. PATENT DOCUMENTS

| | | | | |
|---|---|---|---|---|
| 3,538,710 | A * | 11/1970 | Tourmen | E02B 3/06 405/31 |
| 4,666,334 | A * | 5/1987 | Karaus | E02B 3/041 405/262 |
| 4,820,080 | A * | 4/1989 | Varkonyi | E02B 11/00 405/36 |
| 5,108,223 | A * | 4/1992 | Medina Folgado | E02B 3/12 405/21 |
| 5,655,851 | A * | 8/1997 | Chor | E02B 3/06 405/15 |
| 6,948,886 | B1 * | 9/2005 | Jackson | E02D 17/20 405/36 |
| 7,153,060 | B1 * | 12/2006 | Bennion | E02B 9/00 405/80 |
| 7,438,080 | B2 * | 10/2008 | Johnson | E02F 3/88 417/86 |
| 2005/0042030 | A1 * | 2/2005 | Fu | E03F 5/046 405/36 |
| 2009/0279954 | A1 * | 11/2009 | Griffith | E03F 7/06 405/125 |
| 2010/0086356 | A1 * | 4/2010 | Hopf | E02B 11/00 405/36 |
| 2019/0242083 | A1 * | 8/2019 | Liu | E02B 3/10 |

FOREIGN PATENT DOCUMENTS

| | | |
|---|---|---|
| CN | 109338985 A | 2/2019 |
| FR | 2530696 A1 | 1/1984 |
| JP | 11350448 A | 12/1999 |

* cited by examiner

ECOLOGICAL SEAWALL WATER CLOSE SIDE EMBANKMENT SLOPE DRAINAGE STRUCTURE AND CONSTRUCTION METHOD THEREOF

TECHNICAL FIELD

The present invention relates to the technical field of embankment slope drainage, and more particularly relates to an ecological seawall water close side embankment slope drainage structure and a construction method thereof.

BACKGROUND ART

After the sea waves go over a seawall, they will scour a slope surface of the embankment and form accumulated water in the embankment. If the seawall is heightened and widened and is designed according to a standard of preventing the sea waves from going over the seawall, the sea waves can be prevented from going over the embankment, but the project investment will be greatly increased. According to an existing method, anti-scour and drainage facilities, such as hard protective slopes of concrete masonry, etc., and drainage ditches, are adopted on an embankment top and a backwater slope. However, the hard protective slope lacks ecological characteristics, and is contrary to the concept of ecological civilization construction if in mass use.

SUMMARY OF THE INVENTION

An objective of the present invention is to provide an ecological seawall water close side embankment slope drainage structure and a construction method thereof to solve the problems proposed in the above background art.

In order to achieve the above objective, the present invention provides the following technical solution:

An ecological seawall water close side embankment slope drainage structure includes a seawall and further includes a wave dissipation ridge and water collecting wells.

The wave dissipation ridge is disposed at an upper side of the seawall, a drainage blind ditch is formed in an upper surface of the seawall, and the drainage blind ditch is matched with the wave dissipation ridge.

The water collecting wells are distributed at a lower side of the drainage blind ditch at equal intervals, and lower end portions of the water collecting wells communicate with drainage concealed pipes.

Pipe seats are disposed at a lower end portion of an inclined plane of the seawall, lower end portions of the drainage concealed pipes are fixedly connected onto the pipe seats, and flap valves are rotationally connected to lower end surfaces of the drainage concealed pipes.

Preferably, a longitudinal section of the wave dissipation ridge is in an L shape, a horizontal segment of the wave dissipation ridge is located at a bottom of the drainage blind ditch, an upper end portion of the wave dissipation ridge is provided with an arc-shaped portion, and the arc-shaped portion bends towards the inclined plane of the seawall.

Preferably, a side portion of the drainage blind ditch opposite to a vertical segment of the wave dissipation ridge is in an inclined arrangement, and a layer of grouted rubbles are laid on an inclined plane of the drainage blind ditch.

Preferably, a layer of rubbles are laid on the bottom of the drainage blind ditch, the rubbles are located on an upper surface of the horizontal segment of the wave dissipation ridge, and a layer of pebbles are laid on upper sides of the rubbles.

Preferably, the water collecting wells include well walls and accommodating spaces, upper end portions of the drainage concealed pipes are fixedly connected onto the well walls and are flush with the well walls, and the drainage concealed pipes communicate with the accommodating spaces.

Preferably, a reinforcing mesh is sleeved at lower end portions of the drainage concealed pipes, one end portion of the reinforcing mesh is fixedly connected onto side walls of the corresponding pipe seats, and a gabion mesh pad is disposed at a lower side of the reinforcing mesh.

A construction method of the ecological seawall water close side embankment slope drainage structure includes the following construction contents:

disposing a platform with a width of 1.5 m in a position with a horizontal distance of 5 m away from an embankment shoulder on an inclined plane of the seawall, then, digging grooves in the platform, putting the water collecting wells prefabricated by reinforced concrete into the grooves, then laying geotextile onto upper end surfaces of the water collecting wells to conveniently perform inverted filtration treatment on water downwards seeped from upper sides of the water collecting wells, next burying the drainage concealed pipes having an inner diameter of 0.8 m and a pipe wall thickness of 0.1 m and prefabricated by reinforced concrete into the inclined plane of the seawall in a way of being parallel to the inclined plane of the seawall, installing the glass reinforced plastic flap valves to the lower end surfaces of the drainage concealed pipes, forming the pipe seats through concrete pouring at an embankment toe of the seawall, inserting the end portion of the reinforcing mesh onto the pipe seats in a pouring process of the pipe seats so as to facilitate supporting of the drainage concealed pipes and fixation of the reinforcing mesh, then, pouring concrete onto the inclined plane of the seawall to prevent erosion to the inclined plane of the seawall, and putting the gabion mesh pad on embankment corners of the seawall and at the lower side of the reinforcing mesh;

then forming the wave dissipation ridge with an L-shaped longitudinal section through concrete pouring on an upper surface of the geotextile and an outer edge of the platform, wherein an upper end portion of the vertical segment of the wave dissipation ridge is provided with the arc-shaped portion bending towards the inclined plane of the seawall; using the horizontal segment of the wave dissipation ridge as the bottom of the drainage blind ditch, sequentially filling rubbles with a thickness of 0.35 m and pebbles with a thickness of 0.35 m from bottom to top to form the drainage blind ditch; and then, laying a layer of grouted rubbles 303 with a thickness of 0.5 m on the inclined plane of the drainage blind ditch, and performing slope setting on the drainage blind ditch in a drainage direction from a middle to the water collecting wells at two ends at a slope ratio of 1% so that water in the drainage blind ditch conveniently flows into the water collecting wells.

Preferably, an outer diameter of the water collecting wells is 1.5 m, a depth is 2.0 m, and a well wall 301 thickness is 0.2 m.

Preferably, a bottom width of the wave dissipation ridge is 1.5 m, a burying depth is 1.2 m, and an overground height is 1 m. Compared with the prior art, the present invention has the following beneficial effects:

1. The wave is prevented firstly at the water close side of the embankment, and excessive water bodies are drained into the sea through the concealed pipes, so as to form a one-way drainage system, which is convenient and practical.
2. Wave dissipation is performed on a slope surface of the water close side, and the sea waves are prevented from going over an embankment body, so that the scour to an embankment top and a backwater slope can be avoided.
3. The wave dissipation ridge is made to be in an arc shape, which is favorable for guiding the sea waves into the side of the sea, and can reduce the amount of the sea waves going over the embankment.
4. The drainage blind ditch and the drainage concealed pipes are all buried in the embankment slope instead of being exposed, which does not affect the attractive appearance.
5. The tail ends of the drainage concealed pipes are provided with the flap valves, so that seawater inwelling can be prevented.

In the figures, 100 denotes a seawall, 200 denotes a wave dissipation ridge, 201 denotes an arc-shaped portion, 300 denotes a drainage blind ditch, 301 denotes pebbles, 302 denotes rubbles, 303 denotes grouted rubbles, 400 denotes a water collecting well, 401 denotes a well wall, 402 denotes an accommodating space, 500 denotes a drainage concealed pipe, 501 denotes a reinforcing mesh, 600 denotes a pipe seat, 700 denotes a flap valve, and 800 denotes a gabion mesh pad.

DETAILED DESCRIPTION OF THE INVENTION

The technical solutions in the embodiments of the present invention will be clearly and completely described hereinafter with reference to the accompanying drawings in the embodiments of the present invention. Obviously, the described embodiments are only a few, but not all, embodiments of the present invention. Based on the embodiments of the present invention, all other embodiments obtained by a person of ordinary skill in the art without making any inventive effort are within the protection scope of the present invention.

Figure 1:
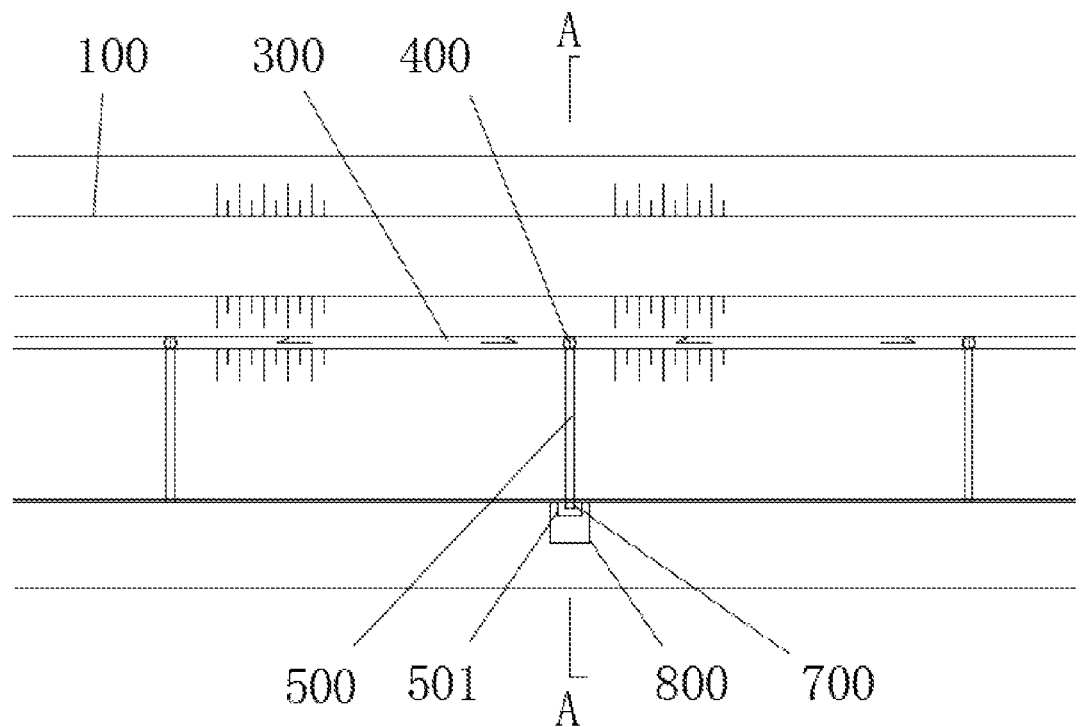
FIG. 1 is a schematic diagram of a front structure of an ecological seawall water close side embankment slope drainage structure of the present invention.
Figure 2:
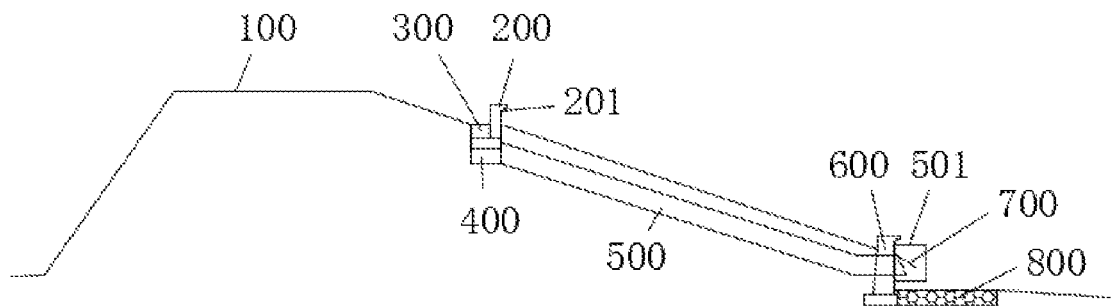
FIG. 2 is a schematic diagram of a sectional structure in an A-A direction in FIG. 1.
Figure 3:
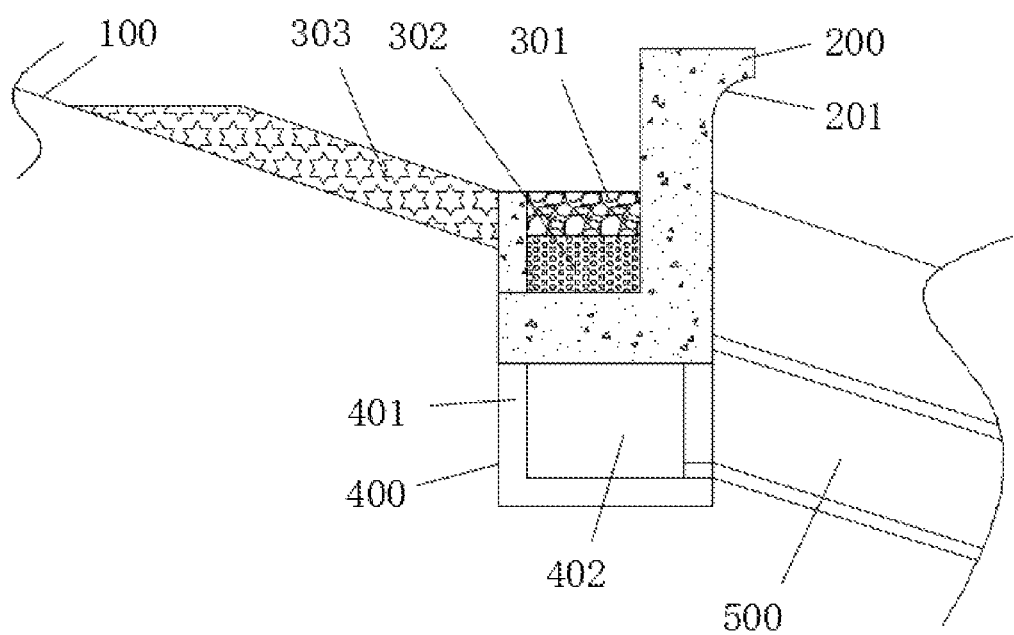
FIG. 3 is a schematic diagram of a local enlarged structure in FIG. 2.

With references to FIGS. 1 to 3, in an embodiment of the present invention, an ecological seawall water close side embankment slope drainage structure includes a seawall 100 and further includes a wave dissipation ridge 200 and water collecting wells 400.

The wave dissipation ridge 200 is disposed at an upper side of the seawall 100, a drainage blind ditch 300 is formed in an upper surface of the seawall 100, and the drainage blind ditch 300 is matched with the wave dissipation ridge 200. The drainage blind ditch 300 is convenient to collect seawater going over the wave dissipation ridge 200.

The water collecting wells 400 are distributed at a lower side of the drainage blind ditch 300 at equal intervals, and lower end portions of the water collecting wells 400 communicate with drainage concealed pipes 500, so that the water in the water collecting wells 400 is convenient to drain out.

Pipe seats 600 are disposed at a lower end portion of an inclined plane of the seawall 100, lower end portions of the drainage concealed pipes 500 are fixedly connected onto the pipe seats 600, and flap valves 700 are rotationally connected to lower end surfaces of the drainage concealed pipes 500. The flap valves 700 can effectively prevent the seawater inwelling.

A longitudinal section of the wave dissipation ridge 200 is an L shape, a horizontal segment of the wave dissipation ridge 200 is located at a bottom of the drainage blind ditch 300, an upper end portion of the wave dissipation ridge 200 is provided with an arc-shaped portion 201, and the arc-shaped portion 201 bends towards the inclined plane of the seawall 100, so that the amount of seawater going over the wave dissipation ridge 200 can be reduced, thereby facilitating the backflowing of the seawater.

A side portion of the drainage blind ditch 300 opposite to a vertical segment of the wave dissipation ridge 200 is in an inclined arrangement, and a layer of grouted rubbles 303 are laid on an inclined plane of the drainage blind ditch 300, so that the seawater going over the wave dissipation ridge 200 can conveniently flow to the bottom of the drainage blind ditch 300 through the inclined plane of the drainage blind ditch 300.

A layer of rubbles 302 are laid on the bottom of the drainage blind ditch 300, the rubbles 302 are located on an upper surface of the horizontal segment of the wave dissipation ridge 200, and a layer of pebbles 301 are laid on upper sides of the rubbles 302, so that the water in the drainage blind ditch 300 can be conveniently filtered, thereby preventing large particles in the water from entering the water collecting wells 400.

The water collecting wells 400 include well walls 401 and accommodating spaces 402, upper end portions of the drainage concealed pipes 500 are fixedly connected onto the well walls 401 and are flush with the well walls 401, and the drainage concealed pipes 500 communicate with the accommodating spaces 402, so that the water in the accommodating spaces 402 can be conveniently drained into the sea.

A reinforcing mesh 501 is sleeved at lower end portions of the drainage concealed pipes 500, one end portion of the reinforcing mesh 501 is fixedly connected onto side walls of the pipe seats 600, and a gabion mesh pad 800 is disposed at a lower side of the reinforcing mesh 501, so that the erosion of the seawater to an embankment toe of the seawall 100 can be effectively prevented.

A construction method of the ecological seawall water close side embankment slope drainage structure includes the following construction contents:

A platform with a width of 1.5 m is disposed in a position with a horizontal distance of 5 m away from an embankment shoulder on an inclined plane of the seawall 100. Then, grooves are dug in the platform, the water collecting wells 400 prefabricated by reinforced concrete are put into the grooves. Then, geotextile is laid onto upper end surfaces of the water collecting wells 400 to conveniently perform inverted filtration treatment on water downwards seeped from upper sides of the water collecting wells 400. Next, the drainage concealed pipes 500 having an inner diameter of 0.8 m and a pipe wall 401 thickness of 0.1 m and prefabricated by reinforced concrete are buried into the inclined plane of the seawall 100 in a way of being parallel to the inclined plane of the seawall 100. The glass reinforced plastic flap valves 700 are installed to the lower end surfaces of the drainage concealed pipes 500, pipe seats 600 are formed through concrete pouring at an embankment toe of the seawall 100, and the end portion of the reinforcing mesh 501 are inserted onto the pipe seats 600 in a pouring process of the pipe seats 600 so as to facilitate supporting of the drainage concealed pipes 500 and fixation of the reinforcing mesh 501. Then, concrete is poured onto the inclined plane of the seawall 100 to prevent erosion to the inclined plane of the seawall 100, and the gabion mesh pad 800 is put on embankment corners of the seawall 100 and at the lower side of the reinforcing mesh 501.

Then, the wave dissipation ridge 200 with an L-shaped longitudinal section is formed through concrete pouring on an upper surface of the geotextile and an outer edge of the platform. An upper end portion of the vertical segment of the wave dissipation ridge 200 is provided with the arc-shaped portion 201 bending towards the inclined plane of the seawall 100. The horizontal segment of the wave dissipation ridge 200 is used as the bottom of the drainage blind ditch 300, and rubbles 302 with a thickness of 0.35 m and pebbles 301 with a thickness of 0.35 m are sequentially filled from bottom to top to form the drainage blind ditch 300. Then, a layer of grouted rubbles 303 with a thickness of 0.5 m are laid on the inclined plane of the drainage blind ditch 300, and slope setting is performed on the drainage blind ditch 300 in a drainage direction from a middle to the water collecting wells 400 at two ends at a slope ratio of 1% so that water in the drainage blind ditch 300 conveniently flows into the water collecting wells 400.

An outer diameter of the water collecting wells 400 is 1.5 m, a depth is 2.0 m, and a well wall 301 thickness is 0.2 m, so that the water downwards seeped from the drainage blind ditch 300 can be conveniently accommodated.

A bottom width of the wave dissipation ridge 200 is 1.5 m, a burying depth is 1.2 m, and an overground height is 1 m, so that the sea waves can be effectively prevented from going over the wave dissipation ridge 200.

In a use process of the present invention, a platform with a width of 1.5 m is disposed in a position with a horizontal distance of 5 m away from an embankment shoulder on an inclined plane of the seawall 100. Then, grooves are dug in the platform, the water collecting wells 400 prefabricated by reinforced concrete are put into the grooves. Then, geotextile is laid onto upper end surfaces of the water collecting wells 400 to conveniently perform inverted filtration treatment on water downwards seeped from upper sides of the water collecting wells 400. Next, the drainage concealed pipes 500 prefabricated by reinforced concrete are buried into the inclined plane of the seawall 100 in a way of being parallel to the inclined plane of the seawall 100, so that the water in the water collecting wells 400 can conveniently drain into the sea through the drainage concealed pipes 500. The glass reinforced plastic flap valves 700 are installed to the lower end surfaces of the drainage concealed pipes 500 so as to prevent the seawater inwelling. The pipe seats 600 are formed through concrete pouring at an embankment toe of the seawall 100, and the end portion of the reinforcing mesh 501 is inserted onto the pipe seats 600 in a pouring process of the pipe seats 600 so as to facilitate supporting of the drainage concealed pipes 500 and fixation of the reinforcing mesh 501. Then, concrete is poured onto the inclined plane of the seawall 100 to prevent erosion to the inclined plane of the seawall 100, and the gabion mesh pad 800 is put on embankment corners of the seawall 100 and at the lower side of the reinforcing mesh 501, so that the erosion of the seawater to the embankment toe of the seawall 100 can be effectively prevented.

Then, the wave dissipation ridge 200 with an L-shaped longitudinal section is formed through concrete pouring on an upper surface of the geotextile and an outer edge of the platform. An upper end portion of the vertical segment of the wave dissipation ridge 200 is provided with the arc-shaped portion 201 bending towards the inclined plane of the seawall 100. The horizontal segment of the wave dissipation ridge 200 is used as the bottom of the drainage blind ditch 300, so that the wave impact resistance capability of the wave dissipation ridge 200 can be improved, and rubbles 302 with a thickness of 0.35 m and pebbles 301 with a thickness of 0.35 m are sequentially filled from bottom to top to form the drainage blind ditch 300, so that the seawater going over the wave dissipation ridge 200 can be conveniently subjected to filtration treatment, and white trashes carried in the seawater can be prevented from entering the water collecting wells 400. Then, a layer of grouted rubbles 30 with a thickness of 0.5 m are laid on the inclined plane of the drainage blind ditch 300, so that the seawater going over the wave dissipation ridge 200 can be conveniently gathered in the drainage blind ditch 300, and slope setting is performed on the drainage blind ditch 300 in a drainage direction from a middle to the water collecting wells 400 at two ends at a slope ratio of 1% so that water in the drainage blind ditch 300 conveniently flows into the water collecting wells 400.

"Fixedly connected" as described in the present invention means that two parts connected to each other are fixed together, generally in modes of welding, screwing or gluing; and "rotationally connected" means that two parts are connected together and can move relative to each other.

Although the specification is described according to implementations, not every implementation includes only a single technical solution, this description is for the sake of clarity only, those skilled in the art should regard the specification as a whole, and the technical solutions in various embodiments may be appropriately combined to form other implementations as will be understood by those skilled in the art.

Therefore, the above description is only a preferred embodiment of the present invention, and is not intended to limit the scope of the present invention. All equivalent changes made within the scope of the claims of the present invention fall within the protection scope of the claims of the present invention.

What is claimed is:

1. An ecological seawall water close side embankment slope drainage structure, comprising:

a seawall (100);

a wave dissipation ridge (200) disposed at an upper side of the seawall (100), wherein the wave dissipation ridge (200) comprises a vertical segment, a horizontal segment, and an upper end portion, and wherein an upper end portion of the wave dissipation ridge (200) is provided with an arc-shaped portion (201) formed in opposite direction to the horizontal segment, and the arc-shaped portion (201) bends towards the inclined plane of the seawall (100);

a drainage blind ditch (300) formed in an upper surface of the seawall (100), and the drainage blind ditch (300) is matched with the wave dissipation ridge (200), the drainage blind ditch (300) comprises a side portion in an inclined arrangement opposite to the vertical segment of the wave dissipation ridge (200), and wherein the horizontal segment of the wave dissipation ridge (200) is located at a bottom of the drainage blind ditch (300);

a water collecting wells (400) distributed below the horizontal segment of the wave dissipation ridge (200) at a lower side of the drainage blind ditch (300) at equal intervals, and lower end portions of the water collecting wells (400) communicate with drainage concealed pipes (500); and pipe seats (600) are disposed at a lower end portion of an inclined plane of the seawall (100), wherein lower end portions of the drainage concealed pipes (500) are fixedly connected onto the pipe seats (600), and flap valves (700) are rotationally connected to lower end surfaces of the drainage concealed pipes (500).

2. The seawall water close side embankment slope drainage structure according to claim 1, wherein a longitudinal section of the wave dissipation ridge (200) is in an L shape.

3. The ecological seawall water close side embankment slope drainage structure according to claim 1, further comprising a layer of grouted nibbles (303) laid on the inclined arrangement of the drainage blind ditch (300).

4. The seawall water close side embankment slope drainage structure according to claim 3, wherein a layer of rubbles (302) are laid on the bottom of the drainage blind ditch (300), the nibbles (302) are located on an upper surface of the horizontal segment of the wave dissipation ridge (200), and a layer of pebbles (301) are laid on upper sides of the rubbles (302).

5. The seawall water close side embankment slope drainage structure according to claim 1, wherein the water collecting wells (400) comprise well walls (401) and accommodating spaces (402), upper end portions of the drainage concealed pipes (500) are fixedly connected onto the well walls (401) and are flush with the well walls (401), and the drainage concealed pipes (500) communicate with the accommodating spaces (402).

6. The seawall water close side embankment slope drainage structure according to claim 1, wherein a reinforcing mesh (501) is sleeved at lower end portions of the drainage concealed pipes (500), one end portion of the reinforcing mesh (501) is fixedly connected onto side walls of the pipe seats (600), and a gabion mesh pad (800) is disposed at a lower side of the reinforcing mesh (501).

7. A construction method of a seawall water close side embankment slope drainage structure, the seawall water close side embankment slope drainage structure comprising a seawall (100) and further comprising a wave dissipation ridge (200) and water collecting wells (400), wherein the wave dissipation ridge (200) is disposed at an upper side of the seawall (100), a drainage blind ditch (300) is formed in an upper surface of the seawall (100), and the drainage blind ditch (300) is matched with the wave dissipation ridge (200); the water collecting wells (400) are distributed below the drainage blind ditch (300) at equal intervals, and lower end portions of the water collecting wells (400) communicate with drainage concealed pipes (500); and pipe seats (600) are disposed at a lower end portion of an inclined plane of the seawall (100), lower end portions of the drainage concealed pipes (500) are fixedly connected onto the pipe seats (600), and flap valves (700) are rotationally connected to lower end surfaces of the drainage concealed pipes (500), the method comprising the following construction contents:

disposing a platform with a width of 1.5 m in a position with a horizontal distance of 5 m away from an embankment shoulder on an inclined plane of the seawall (100), then, digging grooves in the platform, putting the water collecting wells (400) prefabricated by reinforced concrete into the grooves, then laying geotextile onto upper end surfaces of the water collecting wells (400) to conveniently perform inverted filtration treatment on water downwards seeped from upper sides of the water collecting wells (400), next burying the drainage concealed pipes (500) having an inner diameter of 0.8 m and a pipe wall (401) thickness of 0.1 m and prefabricated by reinforced concrete into the inclined plane of the seawall (100) in a way of being parallel to the inclined plane of the seawall (100), installing the glass reinforced plastic flap valves (700) to the lower end surfaces of the drainage concealed pipes (500), forming the pipe seats (600) through concrete pouring at an embankment toe of the seawall (100), inserting the end portion of the reinforcing mesh (501) onto the pipe seats (600) in a pouring process of the pipe seats (600) so as to facilitate supporting of the drainage concealed pipes (500) and fixation of the reinforcing mesh (501), then, pouring concrete onto the inclined plane of the seawall (100) to prevent erosion to the inclined plane of the seawall (100), and putting the gabion mesh pad (800) on embankment corners of the seawall (100) and at the lower side of the reinforcing mesh (501);

then forming the wave dissipation ridge (200) with an L-shaped longitudinal section through concrete pouring on an upper surface of the geotextile and an outer edge of the platform, wherein an upper end portion of the vertical segment of the wave dissipation ridge (200) is provided with the arc-shaped portion (201) bending towards the inclined plane of the seawall (100); using the horizontal segment of the wave dissipation ridge (200) as the bottom of the drainage blind ditch (300), sequentially filling rubbles (302) with a thickness of 0.35 m and pebbles (301) with a thickness of 0.35 m from bottom to top to form the drainage blind ditch (300); and then, laying a layer of grouted nibbles (303) with a thickness of 0.5 m on the inclined plane of the drainage blind ditch (300), and performing slope setting on the drainage blind ditch (300) in a drainage direction from a middle to the water collecting wells (400) at two ends at a slope ratio of 1% so that water in the drainage blind ditch (300) conveniently flows into the water collecting wells (400).

8. The construction method of the seawall water close side embankment slope drainage structure according to claim 7, wherein an outer diameter of the water collecting wells (400) is 1.5 m, a depth is 2.0 m, and a well wall 301 thickness is 0.2 m.

9. The construction method of the seawall water close side embankment slope drainage structure according to claim 7, wherein a bottom width of the wave dissipation ridge (200) is 1.5 m, a burying depth is 1.2 m, and an overground height is 1 m.

* * * * *